United States Patent [19]

Franklin

[11] 4,229,130
[45] Oct. 21, 1980

[54] COLLETS

[75] Inventor: Reginald A. Franklin, Witney, England

[73] Assignee: Crawford Collets Limited, Oxfordshire, England

[21] Appl. No.: 923,652

[22] Filed: Jul. 11, 1978

[30] Foreign Application Priority Data

Dec. 28, 1977 [GB] United Kingdom ............... 53930/77

[51] Int. Cl.³ ........................ B23B 31/20; B23C 5/26
[52] U.S. Cl. ................................ 409/234; 279/46 R; 279/48; 408/226; 408/239
[58] Field of Search ................. 279/1 A, 1 S, 1 ME, 279/1 TS, 9, 60–64, 46–54; 90/11 A; 408/239, 239 A, 226; 409/232, 234

[56] References Cited

U.S. PATENT DOCUMENTS 2,771,297 11/1956 Nipken .................................. 279/1 S
3,719,367 3/1973 Baturka .............................. 279/1 A

FOREIGN PATENT DOCUMENTS 1996804 8/1968 Fed. Rep. of Germany ........... 279/1 S
2418116 10/1975 Fed. Rep. of Germany ........ 279/1 TS Primary Examiner—Z. R. Bilinsky
Attorney, Agent, or Firm—Leydig, Voit, Osann, Mayer & Holt

[57] ABSTRACT

A collet for a threaded-end tool bit, seats a bit-engaging nut in its rear end portion. When the collet is clamped within a chuck, there is no radial interference between the nut and the collet body, thus permitting the gripping segments of the collet to remain in exact parallelism with the tool shank.

6 Claims, 2 Drawing Figures

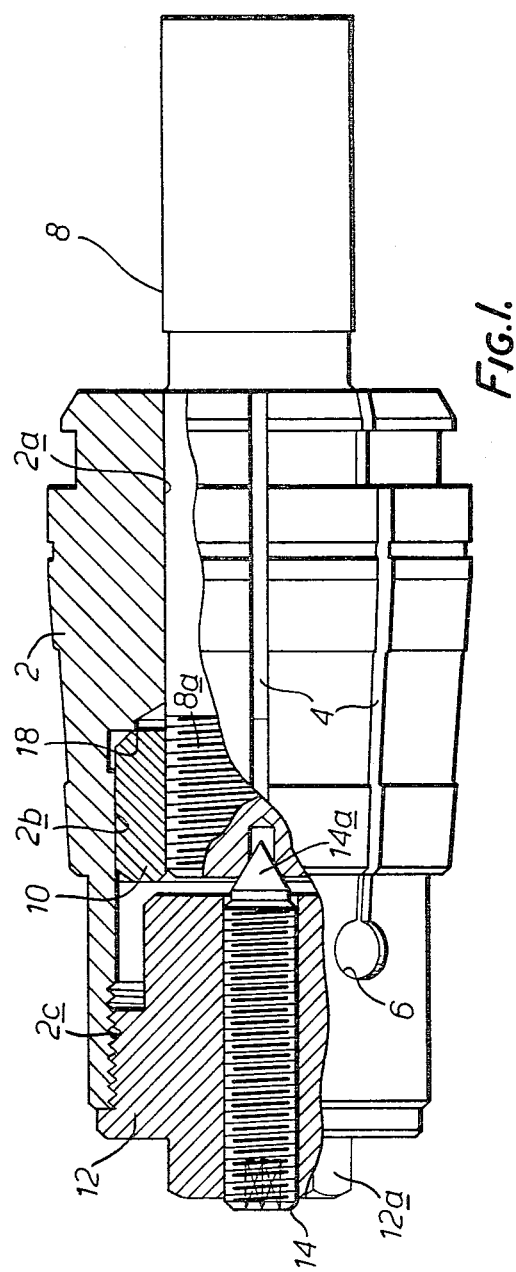

COLLETS

BACKGROUND OF THE INVENTION

1. Field of the Invention

The present invention relates to collets.

2. Description of the Prior Art

Tool bits having a screw thread at their rear end, are known. The threaded end of the tool bit engages a nut located in a collet, and by rotating the bit relative to the nut, the forward projection of the cutting end of the bit from the collet can be accurately set to the required value.

There is proposed in German Utility Model Specification No. 1,996,804 dated Aug. 3, 1968 a collet for a threaded-end tool bit, comprising a body split into a number of segments effective to grip the shank of the tool bit when the collet is clamped within a chuck. A cylindrical nut engaged with the threaded end of the tool bit is seated in the collet to the rear of the bit-engaging surfaces of the collet and is frictionally clamped by the segments. The rear end portion of the body is screw-threaded to receive a threaded member which carries a forwardly-directed spigot arranged to engage the rear end of the tool bit, and to locate positively the tool bit in its selected axial position in the collet. A pin extends from the threaded member into a recess in the nut to secure same against rotation.

In this collet, when the collet is clamped within the chuck, the bit-engaging nut is frictionally clamped within the collet. The radial gripping forces acting on the nut cause the bit-engaging surfaces of the collet to diverge slightly from the shank of the bit with the result that, in practice the collet only grips the bit at its forward end. Although this angle of divergence is small it is sufficient to permit vibration of the bit during use, and further, under certain circumstances the bit may slip.

SUMMARY OF THE INVENTION

According to the present invention, there is provided a collet for a tool bit having a threaded end portion, said collet comprising a body split into a number of segments by a plurality of slots extending axially from the rear end portion of the body, said body having an internal surface extending rearwardly from the front end of the body of a size to grip the shank of the tool bit when the collet is clamped within a chuck, a nut engageable in a portion of the body to the rear of the tool bit-engaging surface such that the nut is restrained against rotation relative to the body, said nut being insertable into the body from the rear end thereof, and the threaded end portion of the tool bit, in use of the collet, being threadedly engaged with the nut, and a member threadedly mounted on the body at the rear end portion thereof to engage the rear end of the tool bit and to lock the tool bit in the nut, the arrangement being such that when the collet is clamped within the chuck there is substantially no radial gripping force between the nut and the collet body whereby substantially the entire length of the tool bit-engaging surface can grip the shank of the tool bit.

Further according to the present invention, there is provided a collet for a tool bit having a threaded end portion, said collet comprising a body split into a number of segments by a plurality of slots extending axially from the rear end portion of the body, said body having an internal surface extending rearwardly from the front end portion of the body of a size to grip the shank of a tool bit when the collet is clamped within a chuck, a portion of the internal surface of the body to the rear of said tool bit-engaging surface being of polygonal cross-section to receive non-rotatably a nut of corresponding cross-section engageable with the threaded end portion of the tool bit, and a member threadedly mounted on the rear end portion of the collet body and having a forwardly-directed projection engageable with the rear end of the tool bit to lock the tool bit in the collet, the internal surface of said portion of the collet body being of such a size and configuration that when the collet is clamped in the chuck there is substantially no radial gripping force between the collet body and the nut whereby substantially the entire length of the tool bit-engaging surface can grip the shank of the tool bit.

BRIEF DESCRIPTION OF THE DRAWINGS

An embodiment of the invention will now be described, by way of example only, with reference to the accompanying diagrammatic drawings, in which:

FIG. 1 is a side elevation, partly in section, of a collet with a cutter tool located therein; and FIG. 2 is a longitudinal section through the collet.

DESCRIPTION OF THE PREFERRED EMBODIMENTS

The collet shown in the drawings comprises a body 2 which is split into a number of segments by a series of axially-directed slots 4 eminating from holes 6 at the rear end portion of the body 2. The body has a stepped inner bore, the front end portion 2a of which is sized to receive the shank of a screwed-shank milling cutter 8 or other tool bit. Beyond the portion 2a, the bore is stepped outwardly to form a portion 2b for receiving a nut 10 which engages a screwed inner end portion 8a of the cutter shank. The portion 2b is of hexagonal section corresponding to that of the nut 10 so that the nut 10 is held against rotation in the bore.

The rear end portion 2c of the bore is threaded to receive an externally-threaded body 12 which carries an axially-directed adjusting screw 14 having a relatively fine thread. The body 12 has at its rear end portion a boss 12a of hexagonal cross-section engageable by a spanner by means of which the body 12 can be screwed tightly into the collet body 2. The adjusting screw 14 is located in a threaded bore extending centrally through the body 12, the inner end portion 14a of the screw 14 being of conical form and projecting axially to engage within a recess of corresponding section formed in the adjacent end of the cutter shank; the axial force applied by the adjusting screw to the cutter shank urges the nut against an axial shoulder 18 formed in the bore between the portions 2a, 2b so that the nut 10 and thus the cutter are held against axial displacement.

The adjusting screw 14 permits fine end adjustment of the cutter 8, the cutter being screwed inwardly or outwardly relative to the nut 10, and the adjusting screw 14 then being tightened to secure the cutter 8 in its selected position. This feature enables the collect to be used for pre-set tooling.

It is to be noted that the holes 6 from which the slots 4 emanate are located behind the zone of the nut 10 in a relatively thin-walled and thus flexible portion of the collet and the design of the bore in the zone of the nut 10 is such that unlike the arrangement in the aforesaid German specification, the nut 10 is not a tight radial fit within the bore. This construction enables the collet to grip the shank along the entire length of the bore portion 2a when the chuck is tightened. In other words, the inner surface of the bore portion 2a is in exact parallelism with the cutter shank, in contrast to that of the aforesaid German specification in which the shank is gripped at the outer end of the collet due to a radially-directed gripping action being exerted between the nut on the cutter shank and the inner surface of the collet body which causes the inner surface of the collet bore to diverge slightly away from the cutter shank. The exact parallelism of the clamping action in the collet described herein ensures that the cutter is rigidly clamped and is not liable to vibration during milling. Also the cutter will not slip or move axially in use.

Instead of using a conventional hexagonal nut, the nut may be of any other suitable cross-section, with the associated bore portion of the collet body being of corresponding cross-section to prevent rotation of the nut. The nut may alternatively be of circular or other cross-section and may be retained against rotation by a key or pin extending between the collet body and the nut. This arrangement thus contrasts with that of the aforesaid German specification in which the nut is held against rotation by means co-operating with the threaded body and which would therefore only be effective when the threaded body is tightly screwed into position onto the collet body.

I claim:

1. In combination a collet, and a tool bit having a threaded end portion, said tool bit being engaged and gripped in the collet, said collet comprising a body having front and rear end portions, means defining a plurality of slots extending forwardly and axially from the rear end portion of the body to split the body into a number of segments, said body having an internal surface extending rearwardly from the front end of the body of a size to grip the shank of the tool bit when the collet is clamped within a chuck, a nut engaged in a portion of the body of the rear of the tool bit-engaging surface such that the nut is restrained, against rotation relative to the body, said nut being insertable into the body from the rear end thereof, and the threaded end portion of the tool bit being threadedly engaged with the nut, a member threadedly mounted on the body at the rear end portion thereof to engage the rear end of the tool bit and to lock the tool bit in the nut, and means defining a radial clearance between said nut and the collet body with said tool bit gripped therein.

2. A collet according to claim 1, wherein the said nut is retained against rotation relative to the body by co-operation between the nut and the said portion of the body.

3. A collet according to claim 2, wherein the nut is of polyonal cross-section and the said portion of the body has an internal surface of corresponding cross-section to that of the nut.

4. A collet according to any one of claims 1, 2 or 3, wherein the said member comprises a main body portion threadedly engageable with the rear end portion of the collet body and an adjusting screw threadedly mounted in the main body for axial movement relative to the main body portion, the adjusting screw having a front end portion engageable with the rear end of the tool bit.

5. A collet according to claim 4, wherein the front end portion of the adjusting screw is of conical form to engage in a conical centering recess at the end of the tool bit.

6. In combination a collet, and a tool bit having a threaded end portion, said tool bit being engaged and gripped in the collet, said collet comprising a body having front and rear end portions, means defining a plurality of slots extending forwardly and axially from the rear end portion of the body to split the body into a number of segments, said body having an internal surface extending rearwardly from the front end portion of the body of a size to grip the shank of a tool bit when the collet is clamped within a chuck, a portion of the internal surface of the body to the rear of said tool bit-engaging surface being of polygonal cross-section, a nut of corresponding polygonal cross-section engaged with the threaded end portion of the tool bit and received in said body portion of polygonal cross-section, a member threadedly mounted on the rear end portion of the collet body, an adjusting screw mounted for axial movement in a main body portion of said member and having a forward end engaged with the rear end of the tool bit to lock the tool bit in the collet, and means defining a radial clearance between said nut and the collet body with said tool bit gripped therein.

* * * * *